July 6, 1965  R. E. GRAY  3,193,132

MOLDED PLASTIC BOX AND COVER

Filed July 2, 1963

INVENTOR.
ROBERT E. GRAY
BY D. EMMETT THOMPSON
ATTORNEY.

United States Patent Office 3,193,132

Patented July 6, 1965

3,193,132
MOLDED PLASTIC BOX AND COVER

Robert E. Gray, Kirkville, N.Y., assignor to Crouse-Hinds Company, Syracuse, N.Y., a corporation of New York Filed July 2, 1963, Ser. No. 292,319
1 Claim. (Cl. 220—60)

This invention relates to electrical conduit fittings of the type used to enclose junctions, splices, or the like, between electrical current conducting wires and wiring devices, such as, switches and the like.

One requirement of such conduit fittings is that they be inexpensive because of the great number of such fittings required in industrial or commercial, and in some cases, residential installations. A further requirement is that the fitting be convenient and simple to install and, at the same time, sufficiently strong to withstand ordinary wear and tear, and further be arranged with a cover designed so as to prevent unauthorized removal of the cover by children, or the like.

One general type of conduit fitting which meets some of these general requirements is the molded plastic type which may be molded from any of the conventional and commercially available vinyls or phenolic resins. A problem heretofore, however, with such plastic conduit fittings has been to provide such fittings with a cover which may be easily and quickly attached to the housing, but yet, at the same time, will stay on the fitting under conditions of vibration, motion, or the like, and will prevent unauthorized removal of the cover. This problem has been solved in the past by providing the cover and body of the fitting with any of a number of fastening means, such as, screws, rivets, or the like. All of such prior fastening means, however, increased the cost of the complete fittings substantially and further caused the installation of the fitting to be more time-consuming and, hence, more costly.

Accordingly, it is an object of the invention to provide a new and improved conduit fitting having a snap-on cover.

More specifically, it is an object of the invention to provide a conduit fitting having inter-fitting cooperable means on the cover and body of the fitting which act when the cover is inserted on the body to releasably lock the cover on the body.

It is a further object of the invention to provide a snap-on cover for a conduit fittings which is simple and economical to construct or fabricate and which, at the same time, maintains a water shedding relationship when attached to the body.

The invention consists in the novel features and in the combinations and constructions hereinafter set forth and claimed.

In describing this invention, reference is had to the accompanying drawings in which like characters designate corresponding parts in all the views.

Figure 1:
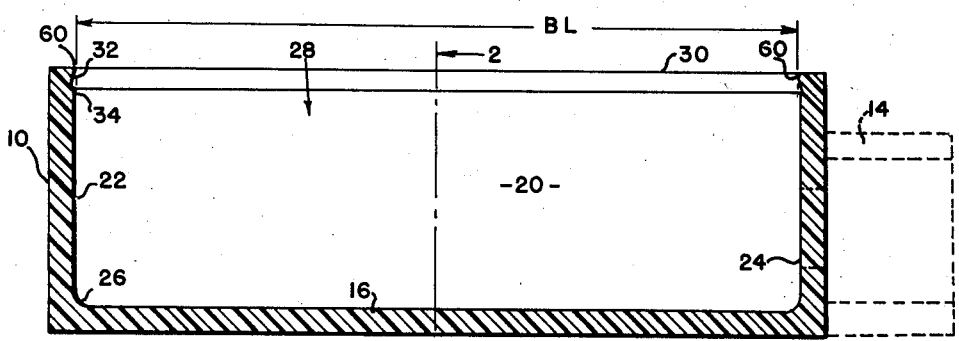
FIGURE 1 is a cross-sectional elevational view of the body of the preferred embodiment of the invention.

The conduit fitting disclosed in the drawings comprises a body or base generally indicated as 10. The body and cover may be made up of any suitable material by any desired means of fabrication as, for example, the material may comprise a phenolic resin, and the body and cover may be fabricated by molding. Such conduit fittings have the advantage of low cost in mass production and are, therefore, becoming the subject of considerable demand in the electrical industries where wiring devices and current conducting wires do not need to be housed or enclosed in explosion-proof fashion, but yet are required by the electrical wiring code, applicable in any given area, to be completely enclosed.

For simplification and ease of disclosure, the conduit fitting shown herein has been shown as the basic body only with conduit receiving hubs, or the like, and all other details omitted. For example, the body may be provided with one or more integral threaded or smooth bore conduit hubs, one of which is indicated by the dotted lines 14 on FIGURE 1.

The body or base 10 comprises a bottom wall 16, side walls 18 and 20, and arcuate end walls 22 and 24. The walls 18, 20, 22 and 24 extend upwardly from the base 16 on a radius indicated at 26 and surround the base 16 so as to form a wiring enclosure 28. The current conducting wires may be spliced together in the enclosure 28 or any wiring devices such as switches, or the like, may be mounted in the enclosure 28. The upper ends of the side walls and end walls of the body terminate in a face portion 30 of substantially flat relation so as to provide a mounting surface for the cover 12, and as will be understood, sealing gaskets or the like may also be received on the surface 30. The inner edge of the surface 30 tapers in a reverse fashion so as to provide an undercut upper wall portion 32 which extends downwardly along the inner surface of the side and end walls for a predetermined amount, after which the portion 32 is joined to the inner sides of the walls by an inwardly and downwardly curved or tapered portion 34, all for a purpose to be hereinafter described. The undercut portion 32 does not cause any difficulty in molding the body 10 out of plastic or the like, since the side walls and end walls are sufficiently flexible to permit withdrawal of the mold core portion which forms the undercut surface 32 and the curved tapered surface 34.

Figure 2:
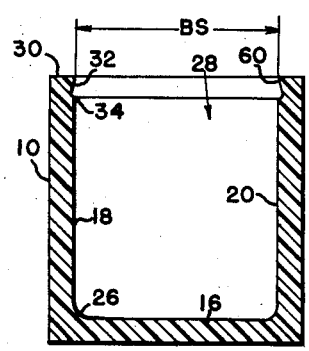
FIGURE 2 is a cross-sectional view taken on line 2—2 of FIGURE 1.
Figure 3:
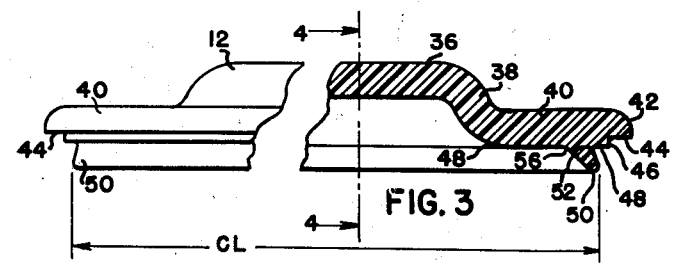
FIGURE 3 is an enlarged broken away cross-sectional elevational view of the cover for the body shown in FIGURE 1.
Figure 4:
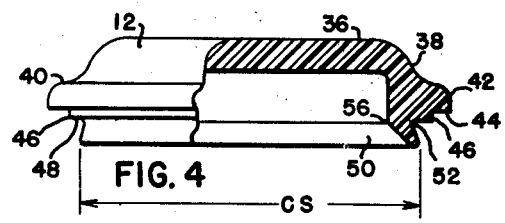
FIGURE 4 is an enlarged, partly cross-sectional view taken on line 4—4 of FIGURE 3.

Referring to FIGURES 3 and 4, the cover is formed of a central raised portion 36 which is connected by a downwardly and outwardly tapered portion 38 to an offset flange portion 40. The peripheral dimension of the outer edge of the flange 40 being co-extensive with the peripheral dimension and shape of the outside of the side and end walls of the body 10 so that when the cover 12 is inserted in the body 10, the cover is seated thereon in a smooth fashion with no projections or protuberances on the cover extending outside the planes of the side and end walls of the body. The outer edge of the flange portion 40 is curved outwardly and downwardly as at 42 and joins with a flat receding portion on the undersurface of the cover indicated by the reference numeral 44. The portion 44 forms a gasket receiving seat in conjunction with the seat 30 on the body 10, and a gasket 45 has been shown in the seat in FIGURES 5 and 6. The portion 44 at its inner end is connected to a short downwardly extending portion 46 which depends from the portion 44. The portion 46 is connected to a portion 48 extending parallel to the portion 44 and offset therefrom and the portion 48 seats on the upper surface 30 of body 10 (see FIGURES 5 and 6). The seat 48 is provided with a rib 50 which interlocks with the undercut portion 32 in the body 10. The rib 50 extends outwardly and downwardly in tapering fashion from its curved joint 52 with the portion 48 on the outer edge thereof and then curves upwardly and inwardly to form a tapered portion 54 which merges at its upper extremity through a curved joint 56 with the seat 48 of the cover. As best seen in FIGURES 3 and 4, reference letters CL indicate the dimension between the outer points of the rib 50 on the long axis and the reference letters CS indicate the dimension between the outer points of the rib 50 on the short axis of the cover. Referring again to FIGURES 1 and 2, the dimension BL is the distance between the upper inwardmost portion of the undercut 32 on the body along the long axis, while the dimension BS indicates the length between these points on the short axis of the fitting.

In order to releasably lock the cover on the body, the dimension CL will exceed the dimension BL as will the dimension CS on the cover exceed the dimension BS on the body. When the cover is placed on top of the body and forced downwardly, the rib 50 on the cover will, by contracting a small amount, cause the undercut portion 32 on the body to flex sufficiently to permit the rib to pass under the top point formed on the undercut portion 32 so as to snap the cover onto the body.

Figure 5:
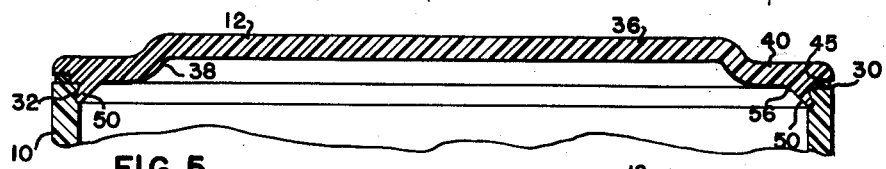
FIGURES 5 and 6 are cross-sectional fragmentary views along the long and short axes of the cover and body in the assembled condition.
Figure 6:
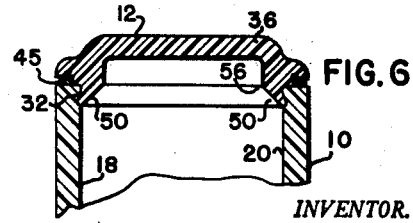
Figure 7:
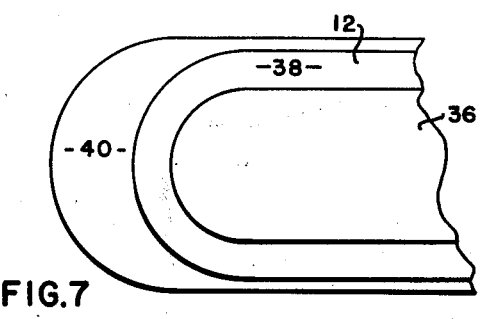
FIGURE 7 is a partial plan view of the cover shown in FIGURES 3 and 4.

The condition of the cover in the body is best seen in FIGURES 5 and 6 wherein the rib 50 formed on the cover is located in the undercut portion 32 of the body so that the upper edge portion 60 formed by the undercut portion 32 in the body provides an interference to prevent the accidental or unintentional removal of the cover. Due to the fact that the cover and the body are molded of a relatively flexible material, this interference, however, will not prevent the cover from being pried loose from the body.

Accordingly, it will be seen that by the unique construction of the body and cover, I have provided a new and improved conduit fitting which is economical to manufacture in volume quantities, but yet, at the same time, permits the unit to be easily and simply installed and provides a cover which snaps on the body portion so as to prevent accidental or unauthorized removal of the cover and allows the cover to be easily removed, when desired, by the use of a suitable prying tool, such as, a screwdriver, or the like.

What I claim is:

An electrical conduit fitting comprising a boxlike body member having an opening in one side and a cover member for said opening, said members being molded from plastic material, said opening being encircled by a flat marginal surface, the inner surface of said opening having contiguous to said marginal surface an undercut groove sloping downwardly and outwardly from the center of said opening, said cover member having on its under side a rib shaped complemental to said opening, said rib sloping downwardly and outwardly and engaged with said groove with an interference fit therebetween, said cover member having a flat marginal surface in engagement with the inner portion of the flat marginal surface encircling said opening, said cover having a second outer flat marginal surface offset upwardly from said first marginal cover surface and extending outwardly therefrom in upwardly spaced overlapping relation to the outer portion of said marginal surface on said body member for the reception of a sealing gasket between said cover member and body member.

References Cited by the Examiner

UNITED STATES PATENTS

| | | | |
|---|---|---|---|
| 2,215,412 | 9/40 | Thompson | 220—60 X |
| 2,470,320 | 5/49 | Page. | |
| 2,628,264 | 2/53 | Esher | 174—65 |
| 2,823,249 | 2/58 | Curtiss | 220—60 X |
| 3,007,602 | 11/61 | Frank | 220—60 |

FOREIGN PATENTS 831,749  3/60  Great Britain.

DARRELL L. CLAY, *Primary Examiner.*